(12) United States Patent
Kopschinski et al.

(10) Patent No.: US 12,708,944 B2
(45) Date of Patent: Aug. 18, 2026

(54) POWDER CONTAINER WITH SOCKET CONNECTOR FOR AN ADDITIVE MANUFACTURING PROCESS

(71) Applicant: Nikon SLM Solutions AG, Lübeck (DE)

(72) Inventors: Daniel Kopschinski, Lübeck (DE); Marcel Overberg, Lübeck (DE); Philip Negendank, Lübeck (DE); Randy Redlich, Lübeck (DE); Sebastian Feist, Lübeck (DE)

(73) Assignee: NIKON SLM SOLUTIONS AG, Lübeck (DE)

( * ) Notice: Subject to any disclaimer, the term of this patent is extended or adjusted under 35 U.S.C. 154(b) by 0 days.

(21) Appl. No.: 19/014,016

(22) Filed: Jan. 8, 2025

(65) Prior Publication Data

US 2025/0249511 A1 Aug. 7, 2025

Related U.S. Application Data

(63) Continuation of application No. PCT/EP2023/067157, filed on Jun. 23, 2023.

(30) Foreign Application Priority Data

Jul. 12, 2022 (DE) ..................... 10 2022 117 391.7

(51) Int. Cl.
*B22F 12/52* (2021.01)
*B22F 12/90* (2021.01)
(Continued)

(52) U.S. Cl.
CPC .............. *B22F 12/52* (2021.01); *B22F 12/90* (2021.01); *B29C 64/255* (2017.08);
(Continued)

(58) Field of Classification Search
CPC ... B29C 64/255; B29C 64/259; B29C 64/329; B22F 12/52
See application file for complete search history.

(56) References Cited

U.S. PATENT DOCUMENTS

2008/0131540 A1 6/2008 Perret et al.
2017/0297813 A1 10/2017 Carroll et al.
(Continued)

FOREIGN PATENT DOCUMENTS

CN 112839756 A 5/2021
CN 214782142 U 11/2021
(Continued)

OTHER PUBLICATIONS

Giovino, Configure Industrial Sensors and Actuators Faster, Safely, and Reliably with SensorActuator Boxes, Aug. 8, 2021, available @ <https://web.archive.org/web/20210808175120/https://www.digikey.com/en/articles/configure-industrial-sensors-and-actuators-with-sensor-actuator-boxes>. (Year: 2021).*
(Continued)

*Primary Examiner* — Xiao S Zhao
*Assistant Examiner* — Nicholas J Chidiac
(74) *Attorney, Agent, or Firm* — Quarles & Brady LLP; Yakov S. Sidorin

(57) ABSTRACT

A powder container for handling powder in an additive manufacturing process. The container includes a powder vessel with a powder inlet in an upper portion thereof and a powder outlet in a lower portion thereof, a set of n sensors configured to determine a set of n observables, a first actuator configured to drive a first mechanical function of the powder container and optionally—to provide for additional safety as well as versatility a second actuator configured to drive a second mechanical function of the powder container and/or a multi-port connector configured to be
(Continued)

connected with a corresponding connector of a powder handling station in an additive manufacturing process.

19 Claims, 12 Drawing Sheets

(51) Int. Cl.

| | |
|---|---|
| ***B29C 64/255*** | (2017.01) |
| ***B29C 64/259*** | (2017.01) |
| ***B29C 64/329*** | (2017.01) |
| ***B33Y 40/00*** | (2020.01) |
| ***B33Y 50/02*** | (2015.01) |
| ***G01D 21/02*** | (2006.01) |

(52) U.S. Cl.
CPC .......... *B29C 64/259* (2017.08); *B29C 64/329* (2017.08); *B33Y 40/00* (2014.12); *B33Y 50/02* (2014.12); *G01D 21/02* (2013.01)

(56) References Cited

U.S. PATENT DOCUMENTS

| | | | | |
|---|---|---|---|---|
| 2022/0176454 | A1* | 6/2022 | Beeby | B33Y 40/00 |
| 2023/0023850 | A1* | 1/2023 | Healey | B33Y 40/00 |
| 2023/0030908 | A1* | 2/2023 | Denisov | B22F 12/57 |
| 2023/0391005 | A1* | 12/2023 | Bonilla | B22F 12/13 |
| 2024/0139820 | A1* | 5/2024 | Tralongo | B04C 5/185 |
| 2024/0198427 | A1* | 6/2024 | Healey | F16K 31/60 |

FOREIGN PATENT DOCUMENTS

| | | | |
|---|---|---|---|
| FR | 3058338 | A1 | 5/2018 |
| GB | 2605601 | B | 1/2025 |
| KR | 0190072154 | A | 6/2019 |
| WO | 2016046539 | A2 | 3/2016 |
| WO | 2020191214 | A1 | 9/2020 |
| WO | 2021123782 | A1 | 6/2021 |
| WO | 2022087043 | A1 | 4/2022 |

OTHER PUBLICATIONS

Henge Docks docking station for Apple MacBooks, Stamatiou, Paul, Feb. 13, 2011, available @ <https://paulstamatiou.com/review-henge-docks-docking-station-apple-macbook>. (Year: 2011).*

Simonelli, J., Introduction to Worm Gearing, Gear Technology, Mar./Apr. 1993, pp. 34-40.

PCT International Search Report and Written Opinion, PCT/EP2023/067157, Aug. 7, 2023, 11 pages.

CNIPA First Office Action, Chinese patent application No. 202380052998.7, Aug. 16, 2025, 16 pages.

* cited by examiner

FIG. 9.1
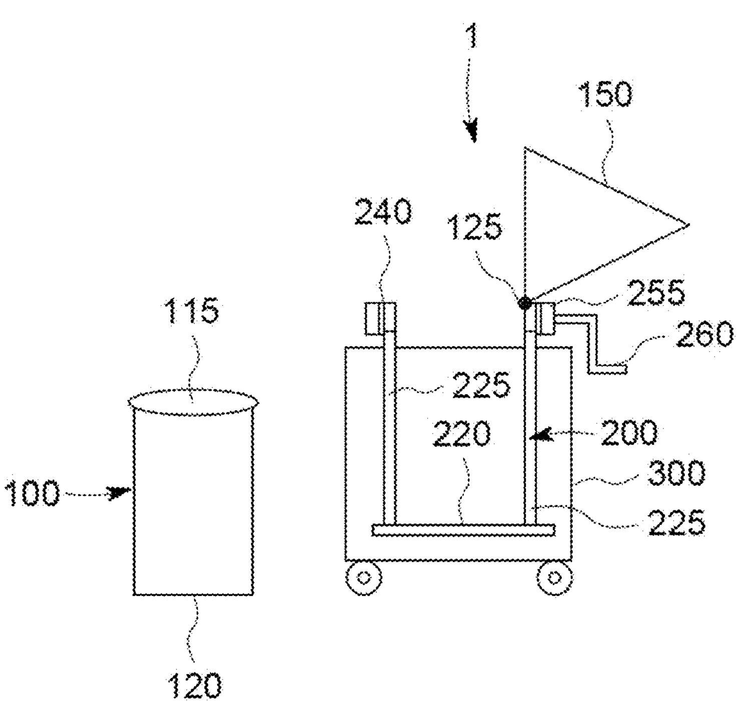

FIG. 9.2
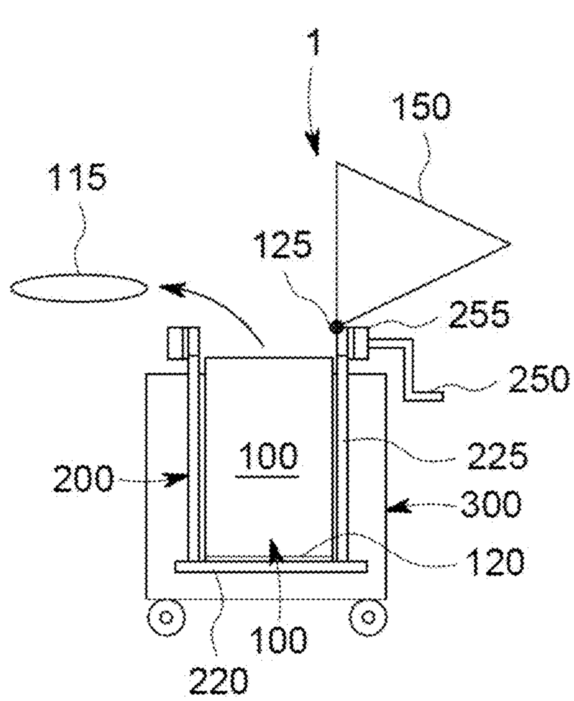

FIG. 9.3
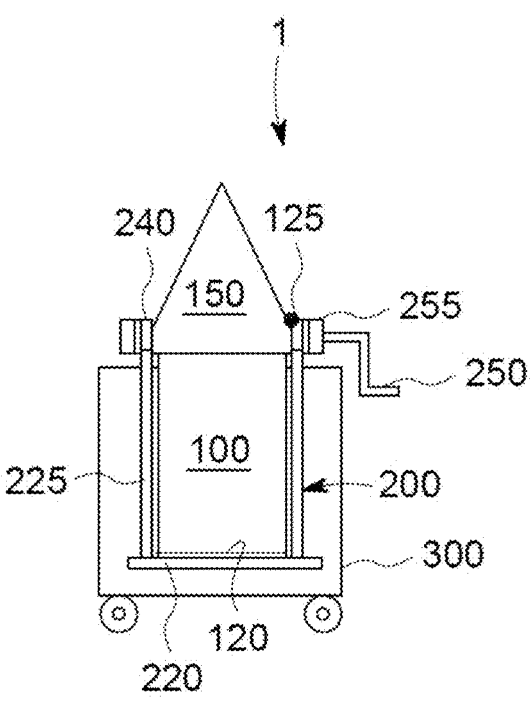

FIG. 9.4
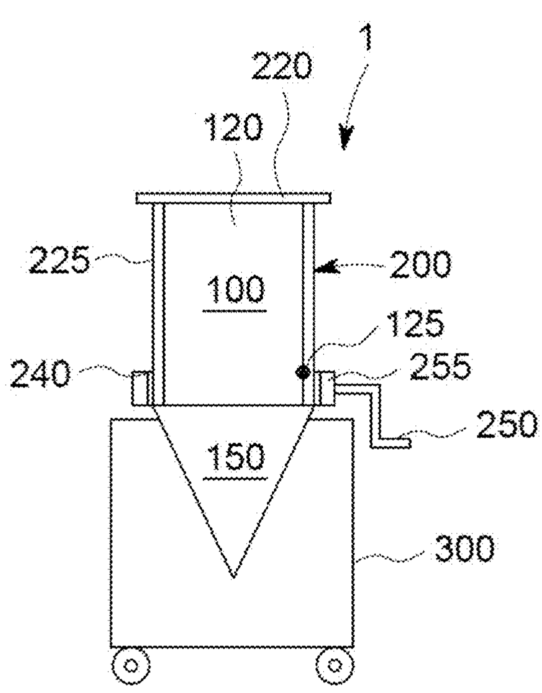

POWDER CONTAINER WITH SOCKET CONNECTOR FOR AN ADDITIVE MANUFACTURING PROCESS

CROSS-REFERENCE TO RELATED APPLICATIONS

This application is a continuation of pending International Application No. PCT/EP2023/067157 filed on Jun. 23, 2023 and now published as WO 2024/012852, which designates the United States and claims priority from German Patent Application No. 10 2022 117 391.7 filed on Jul. 12, 2022. The disclosure of each of the above-identified patent documents in incorporated herein by reference.

FIELD OF THE INVENTION

The invention relates to additive manufacturing according to the powder bed fusion process. In more detail, the invention relates to a powder storage apparatus, as well referred to as 'powder container', for use in the powder bed process. The powder container includes at least a powder vessel (briefly 'vessel') being mounted in a support frame.

DESCRIPTION OF THE RELATED ART

What is commonly referred to as the powder bed fusion process is an additive manufacturing process. In this process powder layers are applied one on top of the previous, to form a powder bed on a support plate. Prior to applying a new powder layer, a portion of the already applied layer is subjected to radiation that adheres a portion of the powder particles of a layer to each other and the previously applied layer by melting, sintering, fusing and/or welding or any similar process. The powder bed fusion process can be considered as fusing a sequence of cross sections of a workpiece to be manufactured on a corresponding sequence of powder layers, to thereby form the workpiece. This fusing is obtained by scanning the cross sections with a radiation beam. Herein, we use the term powder bed fusion process as a pars-pro-toto that includes all other processes that allow to selectively adhere portions of a powder bed by applying radiation to those portions of the powder bed that shall be adhered, regardless of whether or not the adhering is obtained by fusing, melting, welding, sintering or the like. The powder bed fusion process is not limited to but allows—different from most other additive manufacturing processes—to manufacture metal workpieces by selectively fusing metal powder particles. A number of review articles on different aspects and variants of the powder bed fusion process have been published. An overview of at least a portion of those is provided by Yi Zhang, Yeon-Gil Jung and Jing Zhang in *Multiscale Modeling of Additively Manufactured Metals: Application to Laser Powder Bed Fusion Process* (*Additive Manufacturing Materials and Technologies*) (Elsevier, Amsterdam, 2020, ISBN 978-0128196007).

The powder particles typically have a submicron diameter and must be stored under well-defined conditions, typically in an inert gas or vacuum atmosphere as oxidation of the powder would result in a lower workpiece quality.

WO 2021/123782 A1 relates to a coupling system for an additive manufacturing process. The coupling system includes a conduit for the transfer of material between a powder container and a further component of the additive manufacturing process. The conduit includes first and second portions connected via an extendable intermediate portion. Actuators are operable to act on at least a portion of the conduit to extend or retract the intermediate portion to control the length of the conduit. This allows to couple and decouple the coupling system to a powder container's powder release opening. The coupling system includes a mechanical support with four tapered pins that extend upward and are configured to be received by mating through holes of a powder container's support structure.

The authors of WO 2016/046539 A2 suggest a powder container for transporting metal powders from the place of manufacture to an additive manufacturing (AM) machine. The container has a pressure vessel for accommodating the powder, a protective framework for providing physical protection to the pressure vessel and is mounted on an industry standard pallet system to allow the use of forklifters. The pressure vessel consists of an upper portion, a lower portion and a removable lid. The upper portion is a hollow circular cylinder, and the lower portion is a hollow truncated circular cone. At the bottom end of the truncated cone is an outlet tube with an outlet control valve. The outlet tube has a flange for connecting the outlet tube to an AM-machine. On top of the hollow cylinder is the removable lid which allows for filling the pressure vessel, once the lid is removed. Next, the lid is sealingly bolted to the upper periphery of the hollow circular cylinder. The atmosphere in the pressure vessel is monitored by data logging means which are connected to a communication module with a GSM transceiver. A remote monitoring station polls the communication module to thereby trigger transmission of sensor readings by the communication module. These sensor readings are provided by a pressure sensor, an oxygen sensor, a humidity sensor, a strain gauge, an accelerometer, a temperature sensor and a GPS-location sensor.

SUMMARY

The problem to be solved by the invention is to provide an improved powder container for storing and transporting powders as used in the powder bed fusion processes.

Embodiments of the invention are based on a number of observations. Firstly, it has been noted that a number of different powder containers are used in an additive manufacturing plant to handle the powder at different stages of manufacturing, only one of which is the fusion process. For example, once fusing has been completed, the workpiece has to be separated from the powder bed in which it is embedded, and such obtained powder may preferably be prepared for reuse in the powder bed fusion process. Further, the station for preparing reuse (recycling station) necessarily has at least three powder containers, a source container, a recycled powder container and a disposal container. As well, the AM-machine has in addition to the powder source container a powder overflow container and often as well a disposal container and a buffer container. The embodiments allows to use a single type of container instead of all these different containers.

In more detail, the powder container for handling powder in an additive manufacturing process ("AM-process") may include a powder vessel, herein as well briefly "vessel". The vessel may be essentially a hull (a set of vessel walls) enclosing a vessel volume (i.e., the volume of the vessel) for storing the powder. As normal, the vessel has a bottom, at least one side wall and a top.

The vessel, preferably, has a powder inlet and/or a powder outlet. The powder inlet may preferably be an opening in the vessel, i.e., in the hull, being configured to receive powder from a powder source, e.g., via a powder supply line. The powder inlet may preferably be in an upper portion of the vessel, for example in the upper half of the vessel, preferably in the upper third, quarter, fifth and/or tenth of the vessel. In a preferred example the powder inlet is in the top of the vessel. Correspondingly, the powder outlet may be located below the powder inlet, i.e., in a lower portion of the vessel, for example in the lower half of the vessel, preferably in the lower third, quarter, fifth and/or tenth of the vessel. In a preferred example, the powder outlet is at the bottom of the vessel. As usual, the terms “upper” and “lower” refer to a normal an orientation of the vessel as one may expect the vessel to be oriented during normal use, herein as well referred to as ‘first orientation’. As will be explained below in more detail, the vessel may be rotatably supported, e.g. into a second orientation, which second orientation may be for example an inverted orientation—relative to the first orientation. The inverted orientation may as well be referred to aa ‘upside-down’ orientation. Such inverted orientation may be obtained by rotating the vessel by e.g. $180°\pm\alpha_h$, where “$\pm\alpha_h$” indicates that an interval $[180°-|\alpha_h|; 180°+|\alpha_h|]$ is acceptable and where $\alpha_h \in \{30°, 20°, 15°, 10°, 5°, 2.5°, 1°, 0\}$ an where smaller absolute values of at are preferred. The axis of rotation may preferably be at least approximately horizontal, i.e. at least approximately perpendicular to the vertical. At least approximately horizontal means herein, that a deviation from the horizontal within an interval of $[-\alpha_h, \alpha_h]$ are acceptable. At least a portion of the bottom may preferably be a circular cone or a truncated circular cone. The opening angle β of the circular cone or truncated circular cone, respectively, may preferably be between 48° and 62° ($\beta \in [48°, 62°]$), more preferred between 50° and 60° ($\beta \in [50°, 60°]$), even more preferred between 51° and 58° ($\beta \in [51°, 58°]$). A particular preferred opening angle is $\beta=54°\pm1°$ ($\beta \in [53°, 55°]$). These opening angles are preferred as no mechanically driven powder conveying or fluidization means such as vibrators, powder scrapers or the like are required for entirely removing powder from the vessel, while the vessel volume is maximized.

As usual “up” and “down” are directions being defined by reference to the direction of gravitational force (down is parallel to the direction of gravitation, up is the opposite direction, i.e., antiparallel direction). Reference to a “top” or “bottom” assumes an orientation of the corresponding part as observed during normal operation. During normal operation a powder inlet is typically above the center of the vessel (mostly in the top of the vessel) and a powder outlet is typically below the center of the vessel (mostly in the bottom). The bottom of the vessel is the portion of the vessel that delimits the vessel volume downwards. The top of the vessel is the portion of the vessel that delimits the vessel volume upwards. The side wall(s) connect the vessel bottom and the vessel top.

Preferably, the powder container includes a set N of n sensors for determining a set of n observables, wherein n is an integer greater or equal two, i.e., $n \in \{2, 3, 4, \ldots, n_{max}\}$. There is no theoretical limit for $n_{max}$, but in practice one may assume that $n_{max}$ is a small double-digit number (e.g., 20). As already indicated, a greater number for $n_{max}$ is possible, e.g., 100, 1000 or 10.000 or even higher numbers, but presently one would not expect such high numbers of sensors, at least not without having an excessive redundancy in the sensor equipment.

The set N of n sensors may include at least one, preferably more than one sensor of the following list of sensors: a vessel pressure sensor for measuring the pressure in the vessel volume, a force sensor (e.g. a strain gauge) for measuring the force the vessel exerts on the frame, a powder level sensor, a pressure sensor for measuring a pressure upstream of a powder-inlet valve, a pressure sensor for measuring the pressure downstream of a powder-outlet valve, a differential pressure sensor for measuring the pressure difference between the vessel volume and a space upstream of the powder-inlet valve, a differential pressure sensor for measuring the pressure difference between the vessel volume and a space downstream of a powder-outlet valve, a gas concentration sensor for determining at least the partial pressure and/or the concentration of a gas constituent of gas in the vessel volume and/or a space upstream a powder-inlet valve and/or a space downstream a powder-outlet valve. Each of these sensors provides information enabling to monitor the conditions under which the powder in the vessel is stored and/or conveyed into the vessel or out of the vessel. The force sensor may be used to determine the amount of powder in the vessel as well as to determine a measure of compactification of the powder due to vibrations of the vessel by analyzing the force(s) as a function of time and or by determining the center of mass of the vessel and the powder therein. In case the set N includes a powder level sensor, the set N preferably includes at least one an upper powder level sensor and/or at least one lower powder level sensor. The upper powder level sensor may preferably be located in the upper portion, e.g. in the upper third, quarter, fifth, sixth, seventh, eighth, ninth, tenth or $20^{th}$ of the powder vessel and configured to determine if the powder level in the powder vessel is above (including at) or below the location of the upper powder level sensor. Similarly, the lower powder level sensor may preferably be located in the lower portion, e.g. in the lower third, quarter, fifth, sixth, seventh, eighth, ninth, tenth or $20^{th}$ of the powder vessel and configured to determine if the powder level in the powder vessel is above (including at) or below the location of the lower powder level sensor.

The upper powder level sensor and the lower powder level sensors allow to efficiently prevent a powder overflow by shutting the powder flow into the powder vessel of if the upper powder sensor provides a sensor signal indicating a powder level at or above an upper threshold, which upper threshold may be for example the upper powder level sensor location.

The lower powder level sensor allows to ensure that the powder flow through the powder outlet at the bottom of the powder vessel is not interrupted. For example, manufacturing processes drawing powder from the powder vessel can be slowed down or fully interrupted if the lower powder sensor provides a sensor signal indicating a powder level below a given lower threshold. The lower threshold may be the lower powder level sensor location.

The sensor signal of the powder level sensor may be used as a crosscheck, e.g. to validate a signal provided by the force sensor.

Only to avoid ambiguities, generally there exist multiple types of powder level sensors: For example, a distance measuring device may determine the void between the distance measuring device and the top layer of the powder in the vessel. An increase of the distance reflects a decrease of the powder level. In an example, distances can be measured, e.g., by optical distance measuring devices and/or acoustic distance measuring devices (including ultrasound). In yet another example the powder level sensor determines only if the powder level is below or above (including at) a predefined level. Such powder level sensors may include light barriers, capacitive sensors and the like. It comes without saying that all these different types of powder level sensors may be combined to obtain an accurate, reliable and/or redundant measurement.

The powder container may further include a multi-port connector configured to be connected with a corresponding mating connector of a powder handling apparatus in an AM-process. The optional multi-port connector may be a plug or a socket connector having a number of ports. At least one of the ports may include an electrical contact of the multi-port connector. In addition, the multi-port connector may include fluid ports, such as, e.g., a pressurized gas port and/or a vacuum port. The multi-port connector may as well include waveguide ports for connecting waveguides, such as, e.g., optical fiber waveguides. As usual, a multi-port connector is to be understood as plug connector or a as socket connector of a plug-socket connection having at least two, preferably an even higher number of ports. Each port is configured to provide or contribute to a fluid, data and/or energy exchange with the corresponding mating ports a corresponding mating connector of a powder handling apparatus in an AM-process. Fluid ports may include gas ports, such as pressurized air ports, vacuum ports, inert gas supply ports, etc. Energy exchange can be obtained by power line terminals (electrical ports), but as well by a coil for inductive coupling (inductive port) or even by rotary couplings. Pressurized gas may as well be used as an energy source (pressurized fluid port). Data exchange can be obtained by electromagnetic signals (including optical signals) that can be transmitted via electrical cables and/or waveguides. The corresponding electrical cables may have terminals being configured as electrical ports of the multi-port connector and a waveguide may have a waveguide port.

In a preferred example, a first sensor of the set N of sensors may preferably be connected via a first measurement line with a first port of the multi-port connector. As usual a port of a connector is a terminal or the like that allows to transfer electricity (e.g., a voltage signal) or a fluid or an electromagnetic wave (e.g., light) to a corresponding port of the mating connector. In case of a purely electrical connector, each port would be represented by a contact of the connector. We use the term port as generalization of "contact" to include as well fluid connections or wave guide connections.

In more detail, a first end of the first measurement line may be connected to the first sensor and a second end of the first measurement line may be connected to the first port of the multi-port connector. Thus, once the multi-port connector is connected to its counterpart, herein referred to as 'mating connector', of an AM-machine or any other powder handling machine (herein jointly "powder handling station"), the corresponding powder handling station may read the sensor signal of the first sensor (first sensor signal).

Similarly, a second sensor of the set N of sensors may be connected via a second measurement line with a second port of the multi-port connector. In more detail, a first end of the second measurement line may be connected to the second sensor and a second end of the second measurement line may be connected to the second port of the multi-port connector.

Only to avoid ambiguities, a pressure sensor for measuring a pressure in a volume (as well referred to as space) being defined by a vessel or a conduit has at least one fluid opening in fluid communication with the volume and/or is located at least in part in said volume. In this sense the pressure sensor may be configured to measure pressure in the volume. For example, a vessel pressure sensor for measuring the pressure in the vessel volume is thus preferably configured to measure the pressure in the volume of the vessel. In another example, a pressure sensor for measuring a pressure upstream of a powder-inlet valve is a pressure sensor preferably being configured to measure the pressure in the volume being delimited in the downstream direction by the powder-inlet valve member, assuming the powder-inlet valve to be closed and that any valve has a valve member than can be moved between an open and a closed position to thereby open or close the valve. A pressure sensor for measuring the pressure downstream of a powder-outlet valve may preferably be configured to measure the pressure in the volume being delimited in the upstream direction by a valve member of the powder-outlet valve (if the powder-outlet valve is closed). Differential pressure sensors are preferably configured to measure the pressure difference between two volumes. For example, a differential pressure sensor for measuring the pressure difference between the vessel volume and a space downstream of a powder-outlet valve, may be in fluid communication with vessel volume and the volume of the space being delimited in the upstream direction by the valve member of the powder-outlet valve, assuming the powder-outlet valve to be closed.

Summarizing, the powder container may include a set N of n sensors. At least a subset M of m sensors of the set N of nn sensors (m≤n), preferably each sensor of the set N of n sensors, may be connected via a separate measurement line to a separate contact of the multi-port connector. Thereby, operational safety of the powder container is enhanced.

Only to avoid ambiguities, the numbering of the ports does not necessarily follow any convention or standard of port numbering of multi-port connectors. The port numbering herein is only a linguistic measure to distinguish different ports. Electric lines being connected means as usual, that an electrical contact is established between corresponding contacts. Similarly fluid lines or powder lines are connected if a fluid flow or powder flow, respectively, can be established via the connection. For example, a "signal out" contact of a sensor may be electrically connected (electrically contacted) with a first end of a corresponding measurement line. The second end of said measurement line may be electrically connected to a terminal of the corresponding port. A measurement line may thus me an electrically conducting cable.

In a preferred example, the powder container may further include a first actuator for driving a first mechanical function of the powder container. For example, the first actuator may drive a valve member, a mixer or the like. Examples for these actuators will be provided further below.

In a particularly preferred example, the powder container may further include a second actuator for driving a second mechanical function of the powder container. In an example, the second actuator may drive another valve member, another mixer or the like. In other words, controlling the first and/or second actuators enables to operate mechanical devices of the powder container, e.g., powder inlet and/or outlet valves. Only for linguistic simplicity, we assume that a single actuator drives a single mechanical device. But this shall include that a single actuator drives multiple mechanical devices as well as that multiple actuators jointly drive a single mechanical device or that a number of actuators drives any number of mechanical devices.

For example, the powder container may include at least a powder-inlet valve with a powder inlet valve inlet and with a powder inlet valve outlet, wherein the powder inlet valve outlet is connected to the powder inlet of the vessel. As already explained, an actuator may be provided to move the valve member of the powder-inlet valve from the open position to the closed position and/or from the closed position to the open position. Often such valve actuators are solenoid drives, but the embodiments are not limited to these. Other examples are pneumatic actuators.

In addition, or alternatively, the powder container may further include a powder-outlet valve with a powder outlet valve inlet and a powder outlet valve outlet. The powder outlet valve inlet may preferably be connected to the powder outlet of the vessel. Connected is in the context of powder transfer to be understood as usual by a person of skill in the relevant field, namely that powder may flow through the powder outlet of the vessel to the powder outlet valve inlet and in case the valve is open to the powder outlet valve outlet. In case the valve is closed, of course, the powder flow is interrupted.

Generalizing, the powder container may include a first actuator control line with a first end and a second end, wherein the first actuator is connected to the first end of the first actuator control line. A second actuator control line with a first end and a second end may be connected to the second actuator. More generally, the powder container may include a set L of l actuators each being configured to drive a mechanical function. Preferably, each actuator of the set L of l actuators is connected to a first end of a corresponding control line. Thus, there may exist a set C of l control lines each connecting a different actuator. In other words, the $i^{th}$—actuator may be connected to the first end of the $i^{th}$-control line ($\forall i \leq l$).

The powder container may includes a set L of l actuators for driving a mechanical device of the powder container, wherein $l \in \mathbb{N} \setminus \{0,1\}$ and wherein each actuator of at least a subset K of k actuators of the set L of l actuators, i.e. $k \leq l$, $k \in \{1, 2, 3, 4, \ldots, n_{max}\}$, is connected via a separate actuator control line to a separate contact of the multi-port connector.

For example, a powder-inlet valve having a powder inlet flow path with a powder inlet valve inlet and a powder inlet valve outlet may be attached to the powder inlet of the vessel. An inlet-valve member of the powder-inlet valve may be movably supported relative to a valve seat of the powder-inlet valve and may be configured to be moved between a closed position and an open position, wherein the powder-inlet valve is closed by the inlet valve member if the inlet-valve member is in its closed position and the powder-inlet valve is open if the inlet valve member is in its open position. The inlet valve member valve member may be coupled to at least one actuator of the set L of l actuators, preferably to the subset K of k actuators. In other words, the at least one actuator of the set L of l actuators may be configured to move the inlet-valve member of the powder-inlet valve between the closed position and the open position.

For example, a powder-outlet valve having a powder outlet flow path with a powder outlet valve inlet and a powder outlet valve outlet may be attached to the powder outlet of the vessel. An outlet valve member of the powder-outlet valve may be movably supported relative to a valve seat of the powder-outlet valve and may be configured to be moved between a closed position and an open position, wherein the powder-outlet valve is closed by the outlet valve member, if the outlet valve member is in its closed position and the powder-outlet valve is open if the outlet valve member is in its open position. The outlet valve member valve member may be coupled to at least one actuator of the set L of l actuators, preferably to the subset K of k actuators. In other words, the at least one actuator of the set L of l actuators may be configured to move the outlet-valve member of the powder-inlet valve between the closed position and the open position.

In an example, a funnel may be connected with a powder inlet and/or powder outlet of the vessel. In an example, a funnel may be connected to the powder inlet of the vessel, wherein an optional powder inlet valve may be located between the funnel and the vessel volume. Similarly, a funnel may be connected to the powder outlet of the vessel, wherein a powder outlet valve may be located between the funnel and the vessel volume. Thus, a fluid communication between the vessel volume and the funnel is established, if the corresponding valve is open and the fluid communication is interrupted if the corresponding valve is closed.

But the corresponding connection is herein generally considered to provide a fluid communication, although said fluid communication can be interrupted if the corresponding valve is in a closed state.

Each of the optional funnels allows to ease refilling of the vessel via the corresponding opening. In a preferred example, the funnel is removably connected to a powder inlet and/or powder outlet of the vessel. Only to avoid misunderstandings, a funnel is generally understood to be conduit having an inlet end and an outlet end, wherein the cross-sectional area of the inlet end is significantly bigger than the cross-sectional outlet end.

Significantly bigger means that the free diameter of the inlet opening is increased by more than twice the conduit wall thickness. In a preferred example the cross-sectional areas of the inlet opening $A_i$ is x times greater than the cross-sectional area $A_o$ of the outlet opening, i.e. $A_i \geq x \cdot A_o$, wherein $x \in \{1.1., 1.25, 1.5, 2, 2.5., 3, 4, 5, 10\}$.

Preferably, the powder container includes a vessel support structure. The vessel support structure may be for example a frame supporting and preferably protecting the powder vessel. For example, transportation means such as rollers, wheels, or the like may be attached to the vessel support structure.

In a preferred example, the vessel support structure includes a rotary bearing that rotatably supports the vessel. Such rotation may enable to bring the vessel in an inverted an "upside down" orientation converting a powder inlet into a powder outlet (and/or vice versa) and further to break up clusters of adhered powder in the vessel. The rotary bearing thus allows to use a powder inlet as a powder outlet and vice versa, i.e. a single powder opening is sufficient, thereby reducing the number of potential leaks and expensive valves. Only for linguistic consistency we will refer to such bidirectionally usable powder opening of the vessel as well as 'powder inlet'.

In a first 'normal' orientation the powder inlet may be used to pour powder into the vessel volume (e.g. via the optional funnel). In the inverted 'upside-down' orientation the same powder inlet may be used as a powder outlet. Thus, a single powder inlet may be sufficient. The rotary bearing may preferably have an at least essentially horizontally oriented rotational axis. Wherein "almost horizontally" indicates that horizontally is preferred, but that any deviation can be accepted as long as the rotation enables to release powder in the vessel via the powder inlet, if the vessel is rotated into the inverted orientation. As usual "horizontally oriented" means that the rotational axis is at least essentially perpendicular to the vertical if the vessel support structure is oriented as intended during normal operation. At least essentially perpendicular shall indicate that orthogonality is preferred, but that deviations within an angle $\pm\alpha_h$ can be accepted. Example values for $\alpha_h$ are 30°, 20°, 10°, 5°, 2.5° and 1°, i.e. $\alpha_h \in \{30°, 20°, 10°, 5°, 2.5°, 1°, 0°\}$). The acceptable deviation $\alpha_h$ in practice depends on the shape of the vessel. As long as at least essentially all powder flows out of the powder inlet, if the vessel is in its second orientation, the corresponding deviation $\alpha_h$ is acceptable even if it is greater than one of the above example values.

In a preferred example, a funnel is supported by the vessel support structure and includes a coupling connecting a lower opening of the funnel to the powder inlet if the vessel is in its first orientation (as well referred to as the 'normal' orientation) and not connecting the lower opening of the funnel to the powder inlet if the vessel is rotated out of the first orientation.

In a preferred example, the vessel support structure may include a locking mechanism configured to releasably block a rotation of the vessel relative to the vessel-support structure. The locking mechanism thus allows to prevent an unintended rotation of the vessel, e.g. in the first ('normal') orientation and/or in the second ('inverted' or 'upside-down') orientation. The locking mechanism may block a rotation by a releasably positive locking between vessel and the vessel support structure and of by a releasable clamping mechanism. In addition or alternatively, the powder container may include an actuator for rotating the vessel relative to the vessel support structure. The actuator may preferably include a self-impeding transmission which may as well be referred to as a self-locking transmission. Example for such transmissions are self-locking worm gears (see *Introduction to Worm Gearing*, James K. Simonelli; Gear Technology, 1993 Vol. 2, page 34 to 40).

In a preferred example, the vessel has a grate or at least a grate bar extending in the vessel volume. Such grate or grate bar contributes to break up potential powder conglomerations in the vessel while rotating the vessel. Continuous and full powder removal out of the vessel is thereby enhanced.

In another example, the powder container may include a rotatably supported vessel support structure. For example a support frame may rotatably support the vessel support structure. The vessel support structure may have at least a bottom and preferably at least one side support, e.g. a side wall and/or at least one post being attached to the support structure bottom. A powder vessel may be placed removably on the bottom of the vessel support structure. Or in other words, the bottom of the vessel support structure may be configured to receive the bottom of a powder vessel and hence preferably as well to support the powder vessel, e.g. a powder barrel. Such powder vessels may be subjected to standardization, i.e. the powder barrel may be a barrel according to some industry standard. The side support may be configured to support the vessel, e.g., during rotation of the vessel support structure, e.g. to prevent the vessel from tilting relative to the bottom of the support structure. Thus, within the disclosure of this application is a powder container into which a powder vessel has not been installed or removed. Such powder container, which may be considered as a precursor of the powder container.

In a preferred example, the vessel support structure may further include a powder removal funnel. For example, the powder removal funnel (herein as well removal funnel, for short) may be movably attached to another portion of the rotatable vessel support structure, e.g., to a side support of the rotatable vessel support structure. The inlet end of the powder removal funnel preferably faces towards the bottom of the support structure. An example for the movable attachment would be a hinge that allows to pivot the powder removal funnel relative to the side support. Another example would be a linear bearing allowing for translation of the powder removal funnel relative to the side support. The two examples for movably supporting the powder removal funnel may as well be combined. In any case, the powder removal funnel may have at least a first position and/or first orientation, in which it is directly above the bottom of the support structure if the bottom of the support structure is at its lowest position and preferably as well a second position and/or second orientation in which the powder outlet funnel is not directly above the bottom of the support structure (assuming the bottom still being in its lowest position), and hence releases a path for moving a powder vessel onto the bottom of the support structure. The movable attachment allows to move the powder outlet funnel at least between the first position and/or first orientation and the second position and/or second orientation. Only to avoid ambiguities, it is noted that "directly above" does in this context not reference to the distance between the powder removal funnel and the bottom of the support structure, but instead indicates that a projection of the powder removal funnel in a direction being perpendicular to the surface being provided by the support structure bottom configured to receive a powder vessel would provide an image of the powder removal funnel on the bottom of the support structure. To provide a vivid example: One may assume that the support structure bottom is oriented horizontal and in its lowest position, then directly above means that a projection vertically downwards projects the removal funnel on the support structure bottom (assuming no other surfaces to be in between of the removal funnel and the support structure bottom).

In operation, the support structure may initially be oriented such that the support structure bottom, i.e., the bottom of the support structure is at its lowest position. The powder removal funnel may preferably be moved into a position in which the path of a powder vessel onto the support structure bottom is released, i.e., not blocked by the powder removal funnel. For example, the powder removal funnel may be in its second position and/or second orientation. Next, a powder vessel, for example a standardized powder barrel, may be moved onto the bottom of the support structure. The top cap of the vessel may be removed either prior to moving or after moving the vessel on the bottom of the vessel support structure to thereby open a top opening of the vessel. Thus, the top opening of the vessel may preferably be open and preferably oriented upwards (if the support structure bottom is still in its lowest position).

Subsequently, the powder removal funnel may be attached with its inlet end to the to the top opening of the vessel, by moving it into its first position and/or orientation. Preferably, the powder removal funnel has a gasket at its inlet side that provides an at least powder tight seal with the vessel's. Thus, the powder removal funnel and the vessel volume may be in fluid communication via the vessel opening, but powder is not released inadvertently by gap between the powder removal funnel and the powder vessel if the powder removal funnel is in its first position and/or first orientation.

In a preferred example, the movable attachment of the powder removal funnel may be blocked at least in the first position and/or orientation, to thereby secure the powder vessel in its position and orientation relative to the rotatably supported support structure. In other words, the powder removal funnel may clamp the vessel against the support structure bottom, if it is in its first position and/or orientation.

Thus, by rotating the support structure, the powder vessel—being held in position relative to the support structure can be inverted. Now the top opening of the powder vessel points downwards, and powder may pour down into the inlet opening of the powder removal funnel. Such powder may hence be withdrawn via the outlet of the powder removal funnel and may be provided via an optional powder conduit to a powder drain.

Thus, if not yet connected, the outlet end of the powder outlet funnel may preferably be connected to a powder removal conduit for conveying powder to a powder drain. Examples for a powder drain may be an additive manufacturing machine and/or a powder recycling apparatus and/or a powder filling station, etc.

Preferably, a funnel outlet valve may be located at the powder outlet end of the powder outlet funnel. This allows to connect the powder drain after rotating the support structure. If the powder outlet valve is open, powder may flow out of the powder outlet end, e.g., into the optional powder removal conduit. If the powder outlet valve is closed there is no fluid communication between the removal funnel and the environment even if the removal conduit is not connected. Thus, the support structure may be configured to be rotated as required without having a constraining powder removal conduit attached to it.

If the powder vessel shall be removed from the powder container, the support structure may be rotated again, e.g., until the bottom is in its lowest position again. The powder removal funnel may be moved into its second position and/or second orientation and thereby release the powder vessel and free the path for removing the powder vessel out of the support structure. Once removed, another (or the same) powder vessel may be placed again on the support structure bottom.

It is noted that above we assumed above that the support structure bottom has to be in its lowest position to insert or remove a powder vessel and that in this lowest position the bottom is oriented at least essentially parallel to the horizontal. But none of these features are required. It may even be advantageous if the bottom is not parallel to the horizontal and/or not in its lowest position during insertion or removal of a powder vessel. In this case the powder vessel may slide over the side support of the support structure when being moved in and/or out of the support structure. This may even be required, e.g., if the room ceiling is too low to lift the powder vessel vertically in and/or out of the vessel support structure. Above, the term lowest position is only used to render the description more vivid and it may be replaced by "powder vessel removal position" wherever it occurs and wherein in the powder vessel removal position the support structure bottom may preferably be below the powder removal funnel, whereas in the inverted position the powder removal funnel outlet end may preferably be below the support structure bottom. Although, it is noted that the lowest position of the support structure bottom is a preferred example for the powder vessel removal position.

Further, we assumed that in the second position and/or orientation the powder removal funnel is not directly over the support structure bottom. This is as well not required. All being required is that a path for insertion and/or removal of a powder vessel is released when moving the powder removal funnel from its first position and/or location into its second position and or location.

Preferably, the powder container may have an inert gas intake port. The powder container may further have a pressure-reducing valve with a high-pressure inlet and a low-pressure outlet, and the vessel may include an inert gas inlet opening. The inert gas intake port may preferably be in fluid communication with the high-pressure inlet of the pressure-reducing valve, and the low pressure-outlet of the pressure-reducing valve may preferably be in fluid communication with the inert gas opening. Thereby, the pressure being provided via the inert gas intake connector (inert gas intake port) to the vessel is reduced to a predetermined pressure in the vicinity of the vessel. The length of the line from the pressure-reducing valve to the inert gas opening of the vessel can be much shorter and hence have a much smaller diameter. This helps to cut costs down. Further, the pressure provided to the vessel of a given powder container does not vary. It is excluded intrinsically, i.e., by the design of the powder container, that a vessel is subjected to higher pressure than specified, which may lead to vessel explosion and/or a powder release, being critical as submicron powders as used in AM-machines may enter human lungs.

Preferably, an inert gas control valve may be located in a gas line providing the fluid communication between the inert-gas port and the inert gas inlet of the vessel. For example, the high-pressure input of the pressure-reducing valve may be connected to an outlet of the inert gas control valve and the inlet of the inert gas control valve may be in fluid communication (by a corresponding conduit) with the inert gas inlet port. In an alternative, the inert gas inlet port may be connected to an inlet of the pressure-reducing valve and the outlet of the pressure reducing valve may be connected to the inlet of the inert gas control valve. The outlet of the inert gas control valve by in fluid communication with let inert gas inlet of the vessel. Both alternatives further enhance operational safety.

It is particularly preferred, if the inert gas control valve has an inert gas control-valve actuator wherein the inert gas control valve actuator is a member of the subset K of k actuators of the set L of l actuators. This allows to avoid unintended pressure rise or drop in the vessel by a powder container handling station, if the corresponding port (i.e., the inert gas valve actuator control port) of the mating connector of the powder container handling station is simply omitted or not connected to a controller of the container handling station.

Preferably, the powder container includes a gas removal port. The gas removal port may preferably be in fluid communication via a gas removal control valve with the vessel volume. To be more precise, the vessel may include a gas removal outlet and the gas removal outlet may be connected via a first portion of a gas removal line with an inlet opening of the gas removal control valve. An outlet of the gas removal control valve may be connected by a second portion of the gas removal line with the gas removal port. In other words, the gas removal port may be configured to withdraw gas from the vessel and can be closed and opened by opening the gas removal control valve. The gas removal control valve may have a gas removal control valve member being coupled to an actuator of the subset K of k actuators of the set L of l actuators. This as well allows to prevent an unintended operation of the gas removal control valve in a powder container handling station if the corresponding port of the mating connector of the powder container handling station is simply not connected to the corresponding controller or fully omitted. The gas removal port can be used, e.g., to reduce the gas pressure in the vessel by coupling a vacuum pump or any other low-pressure source to the gas removal port and open the gas removal control valve. Gases being detrimental to the powder and or an AM-process, such as, e.g., water vapor (moisture) and/or oxygen may be removed from the vessel via the gas removal port. The gas removal control valve may as well be opened when flooding the vessel with an inert gas via the inert gas inlet to allow gas to be pressed (or sucked) via the gas removal port out of the vessel.

In a preferred example, the powder container includes a pressure sensor configured to determine the gas pressure upstream and/or downstream of the gas removal control valve. In addition, or alternatively, the powder container may include a differential pressure sensor configured to measure a pressure difference between first and the second portion of the gas removal line. The pressure sensor and/or the differential pressure sensor are/is preferably a member of the subset M of the set N of n sensors.

Preferably, a gas removal port connection sensor is connected to a first end of a gas removal port connection sensor line. A second end of the gas removal port connection sensor line may be connected to a port of the multi-port connector. In other words, the gas removal port connection sensor may preferably be as well a member of the subset M of the set N of n sensors.

In a preferred example, the powder container may include a support frame, which shall be understood as a preferred example of a vessel support structure. The vessel support structure may have mounts for being attached to crane and/or receptacles to receive tines (prongs or teeth) of a fork lifter. Preferably, the vessel is inside of the vessel support structure and hence protected at least to a certain extent against mechanical damage, e.g., due to collisions, by the frame structure. The multi-port connector may be attached to the vessel support structure and/or the vessel and preferably does not extend over the contour of the vessel support structure. Thereby, the connector is protected as well by the vessel support structure. The ports of the multi-port connector preferably face outwardly, to thereby ease connecting the multi-port connector to a mating connector of a powder handling station.

The powder container may preferably include at least one locking shaft. The locking shaft may be rotatably supported relative to the vessel. This does not imply that the corresponding bearing is directly mounted to the vessel, although it may be, but that the rotation of the locking shaft is relative to the coordinate system of the vessel. In a preferred example, the bearing supporting the locking shaft is mounted to the (optional) vessel support structure, e.g., to a bottom section of the vessel support structure. The locking shaft has a proximal end and a distal end. Herein, the proximal end is closer to the vessel than the distal end. In a preferred example, the distal end faces in at least essentially the same direction (within an angle $\pm\alpha$, and $\alpha \in \{30°, 20°, 10°, 5°, 2.5°, 1°, 0°\}$) as the bottom of the vessel and/or a side wall of the vessel. A locking member may be torque transmittingly coupled to the distal end of the locking shaft. Further, the coupling member may preferably be coupled to the locking shaft to transmit axial forces. Preferably, the locking shaft is driven by a locking-shaft actuator. The locking shaft enables to interlock the powder vessel with a powder handling station. This increases safety of operation of the powder container, because it can simply be avoided that the powder container falls from the powder container support in case of an earthquake and/or an impact, e.g., by a forklift truck or the like. In a preferred example, the locking member has a broken rotational symmetry with reference to the axis of rotation of the locking shaft. This broken symmetry enables to insert the locking member into a locking member opening while positioning the powder container on and/or in a powder container support and to provide positive locking of the locking member with the structure defining the locking member opening by rotation the locking shaft. In another example, the locking member may be a thread that may engage by rotating the locking shaft into a mating thread of the powder container support.

In both examples, an axial movement of the locking shaft and hence of the powder container away from the powder container support is prevented by a positive locking. The locking-shaft actuator may preferably be a member of the subset K of the set L of l sensors.

The above explained features jointly contribute to an increased operational safety of the powder container. An unintended powder release, e.g., because at a powder handling station a valve was erroneously opened due to a misinterpretation of a sensor reading can be avoided because only those sensors can be read by the corresponding handling station which are intended to be read in the corresponding powder handling station. Similarly, actuator control ports of the mating multiport connector that are not required in a particular powder handling station can be omitted or left unconnected. For example, in a gas pressure adjustment station and/or gas mixture adjustment station, there is no need to open or close the powder-inlet valve or the powder-outlet valve. In this station the mating ports that will contact the ports being connected to the actuators (via the corresponding lines) driving the corresponding valve members are simply not connected to the controller of the powder handling station. Thus, an unintended powder release due to a software bug or the like is intrinsically avoided. Similarly, in other powder handling stations, mating ports of the multi-port connector that would be connected to sensors and/or actuators that are not required to perform the task of the respective powder handling station are preferably omitted and/or not connected to the controller of the respective powder handling station.

As already apparent, control lines are preferable electrically conducting cables, but not limited to these. For example, in case an actuator is controlled/operated hydraulically (i.e., by a pressurized fluid), the control line may be a hydraulic line or a pneumatic line, depending on the fluid. The purpose of the control line is to connect the corresponding actuator preferably via the port of the multi-port connector with a controller of an AM-powder handling station, the latter being a synonym for an apparatus for handling powder being provided to or from the powder container or being stored in the powder container and/or a powder container servicing station.

A powder handling station may be any machine configured to either use the powder for AM, i.e., the AM-apparatus itself, but as well a workpiece removal station for removing workpieces from a powder bed and/or a powder recycling station and/or a powder container refill station and/or a station for adjusting the gas composition and/or pressure in the vessel to name only a few. In short, any apparatus that serves to provide, prepare or collect powder in an AM-manufacturing environment is a powder handling station as well referred to as powder handling machine or powder handling apparatus.

The terms "connected" or "connection" are used above to express that two parts are joined together to provide a function being implicit to the parts. For example, if two conduits are connected, the corresponding connection provides a fluid communication, i.e., a fluid or a powder my flow from a first of the two conduits into the other (unless the flow is blocked by a closed valve). Similarly, a connection of two electrical contacts allows for a flow of an electric current between the two contacts. A waveguide connection provides for the ability of an electromagnetic wave to propagate from a first waveguide into the connected other waveguide and so forth. A transmission may connect for example an input shaft and an output shaft. Above the term "line" has been used as superordinate to cover the terms electric cable, conduit and waveguide and may be replaced by "electric cable and/or conduit and/or waveguide". All three examples enable to transfer power and/or information from a first end of the line to the other end of the line.

The term "port" is used herein as superordinate for electric terminal of a connector, a fluid terminal (fluid port) and/or waveguide port. A port may, but does not need to, be integrated in corresponding connector. A multi-port connector has at least two ports, which may be of different types. But the at least two ports are not necessarily of different types. A multi-port connector may have a first number of electrical terminals (electric ports), a second number of fluid ports and a third number of waveguide ports, but not all of these ports are necessarily connected to a corresponding line.

BRIEF DESCRIPTION OF THE DRAWINGS

In the following, the invention will be described by way of example, without limitation of the general inventive concept, on examples of embodiment and with reference to the drawings.

FIG. 9 includes a set or combination of four sub-figures (FIG. 9.1 to FIG. 9.4) that illustrate four steps of a method for using the powder container of FIG. 8.

Figure 1:
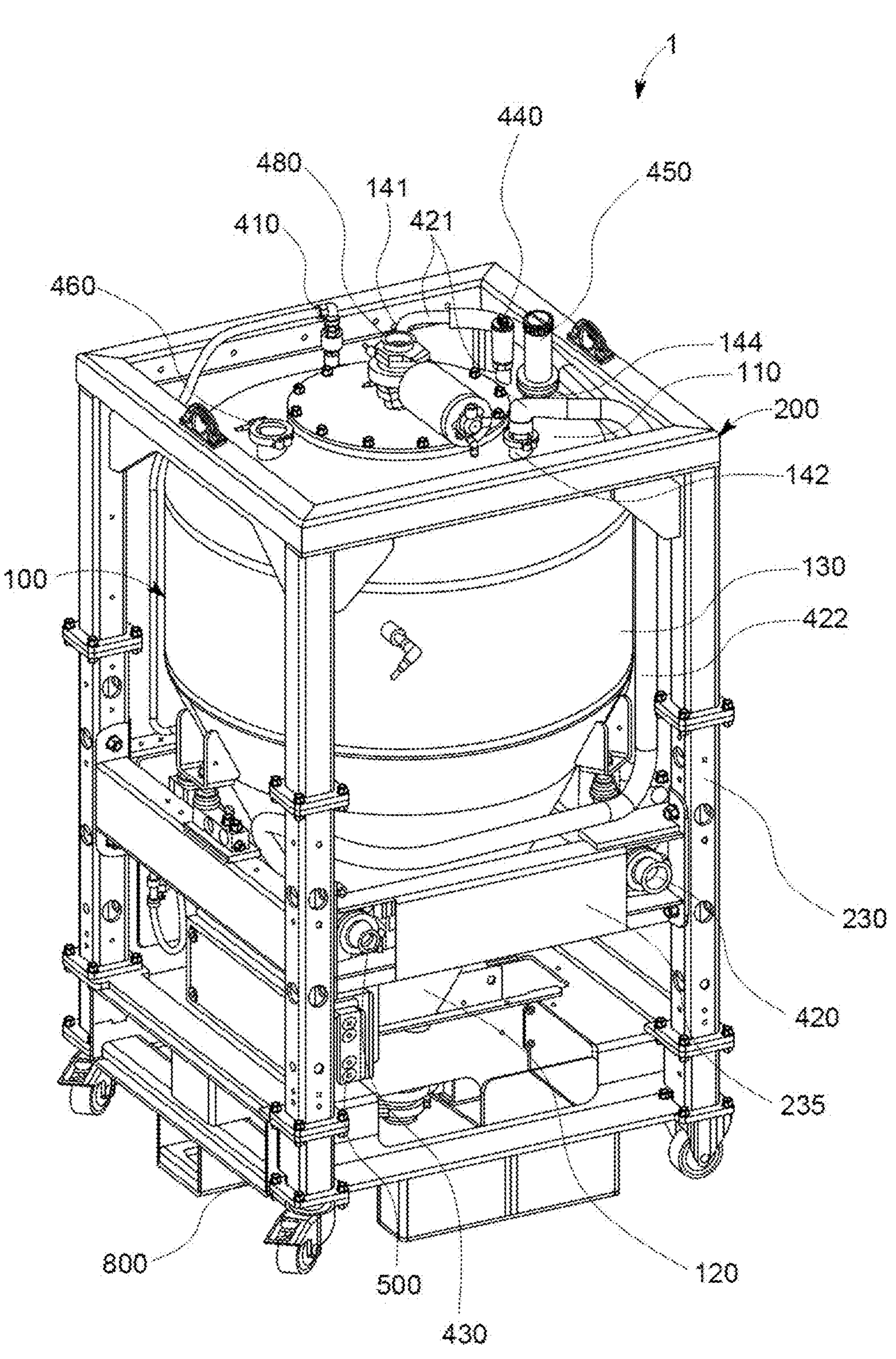
FIG. 1 shows a sketch of a powder container.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1 a first embodiment of a powder container 1 for handling powder in the context of an AM-process (powder bed process) is shown. The powder container includes a vessel 100. The vessel 100 may include a top 110 and a frustoconical bottom 120 that essentially forms a funnel. In the depicted example, the opening angle β of the frustro conical bottom 120 is 54°, but other values of the opening angle β are as well possible. A preferred interval for the opening angle β is [48°; 62° ], i.e., β∈[48°; 62° ]. A sidewall 130 connects the top 110 and the bottom 120 of the vessel.

As shown, the powder container 1 may further include a frame 200 being an example for a vessel support structure 200. In the present example, the frame has four vertical posts 230, but other numbers of posts are possible as well. The posts may be connected with their respective neighbors by cross beams 235. The lower portion of the posts may be attached to an optional bottom section 800 that will be described in more detail with reference to FIG. 7.

The powder container 1 may have a number of interfaces for interacting with powder handling stations in an AM-process. Some of these optional features are a pressure compensation port 420 and a gas removal port 430. The powder container may further include a multi-port connector 500. The multi-port connector 500 may be mounted inside the frame 200, i.e., as shown, it does not extend over the frame 200, but it faces with its connecting ports outwardly to be connected by a mating connector of powder handling station.

Figure 2:
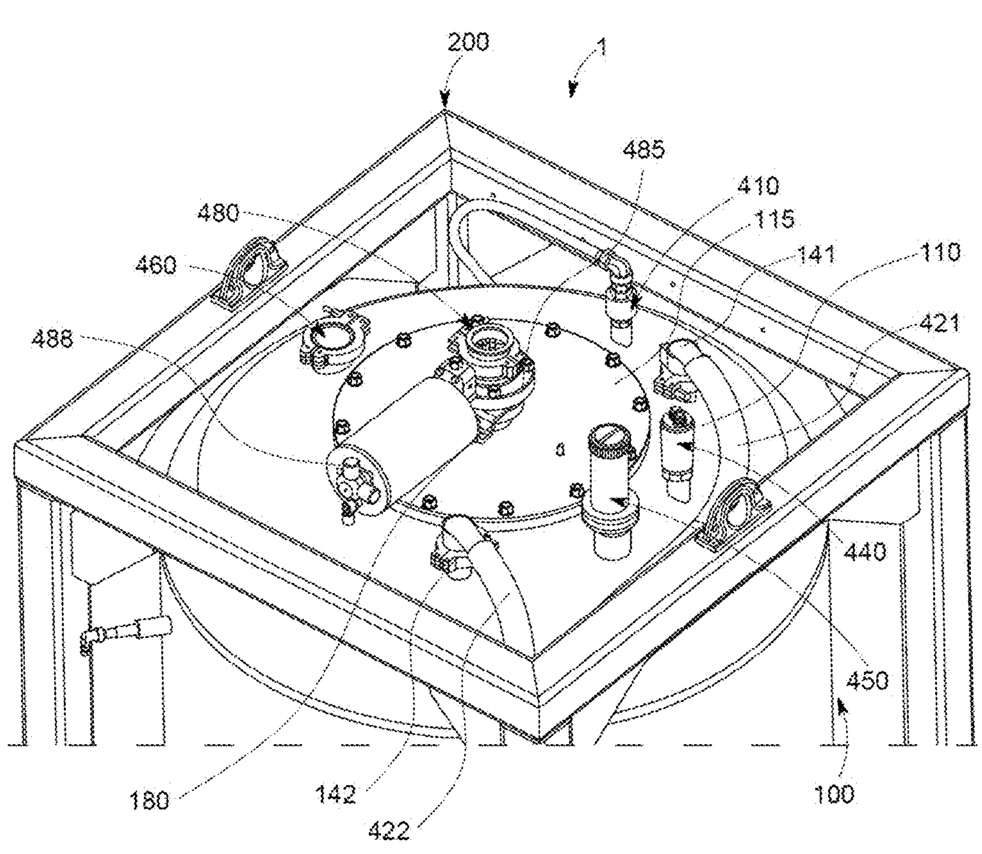
FIG. 2 shows a detail of a partially mounted powder container.

FIG. 2 shows a detail of the powder container 1. As can be seen, the vessel 100 may feature an inert gas inlet 410, preferably in the top 110 of the vessel 100. The vessel 100 may further feature a pressure sensor 440 for measuring the pressure inside the vessel 100 and/or a safety valve 450 and/or a spare socket 460.

The powder container 1 may further include a powder-inlet port 480. The powder-inlet port 480 may be in fluid communication with an inlet of a powder-inlet valve 485. The outlet of the powder inlet valve is in fluid communication with a powder inlet 180 of the vessel 100 and hence with the volume being enclosed by the vessel 100. The powder-inlet valve 485 can be opened and closed by correspondingly controlling a powder inlet valve actuator 488.

Figure 3:
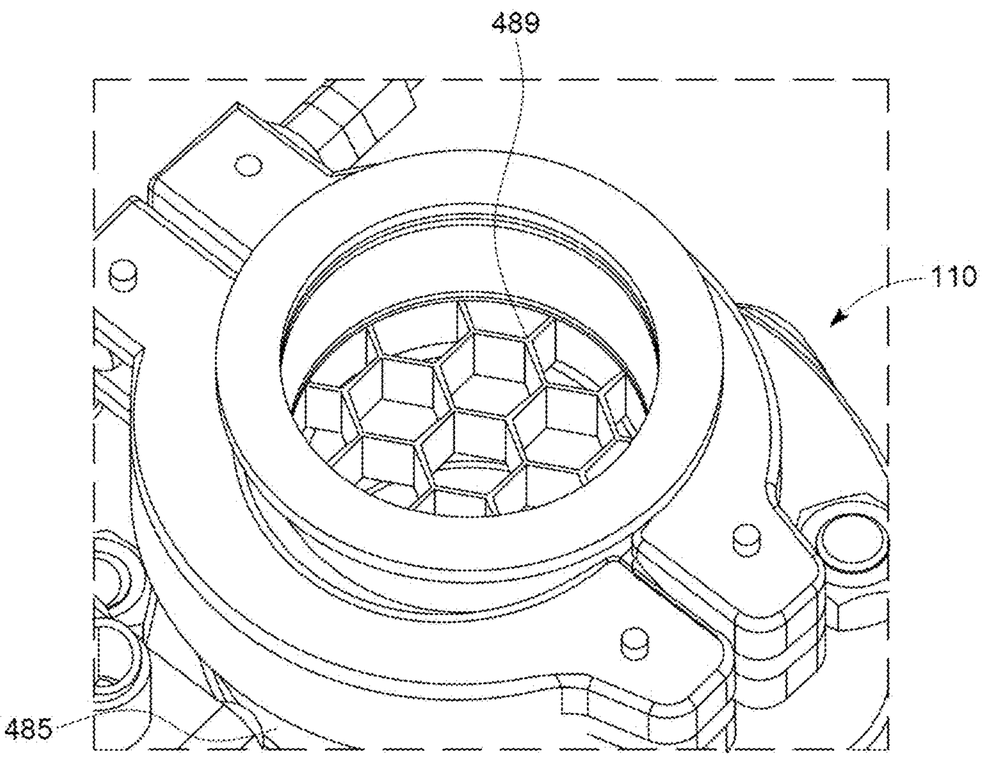
FIG. 3 shows another detail.
Figure 4:
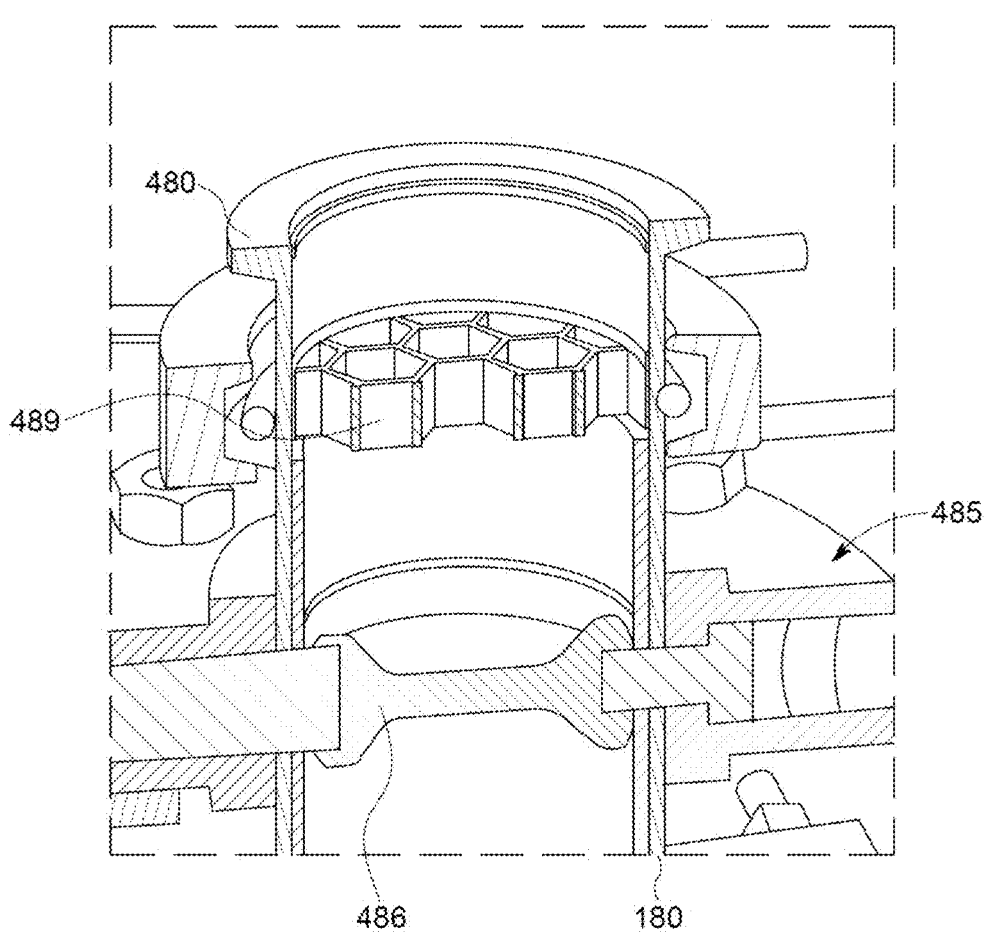
FIG. 4 shows a cross section of the portion of the powder container as shown in FIG. 3.

As can be seen in FIG. 3 and FIG. 4, a grate 489 may be provided upstream of the powder-inlet valve 485 to protect humans operating with the powder container from being injured by a movement of the powder inlet valve's valve member 486.

Figure 5:
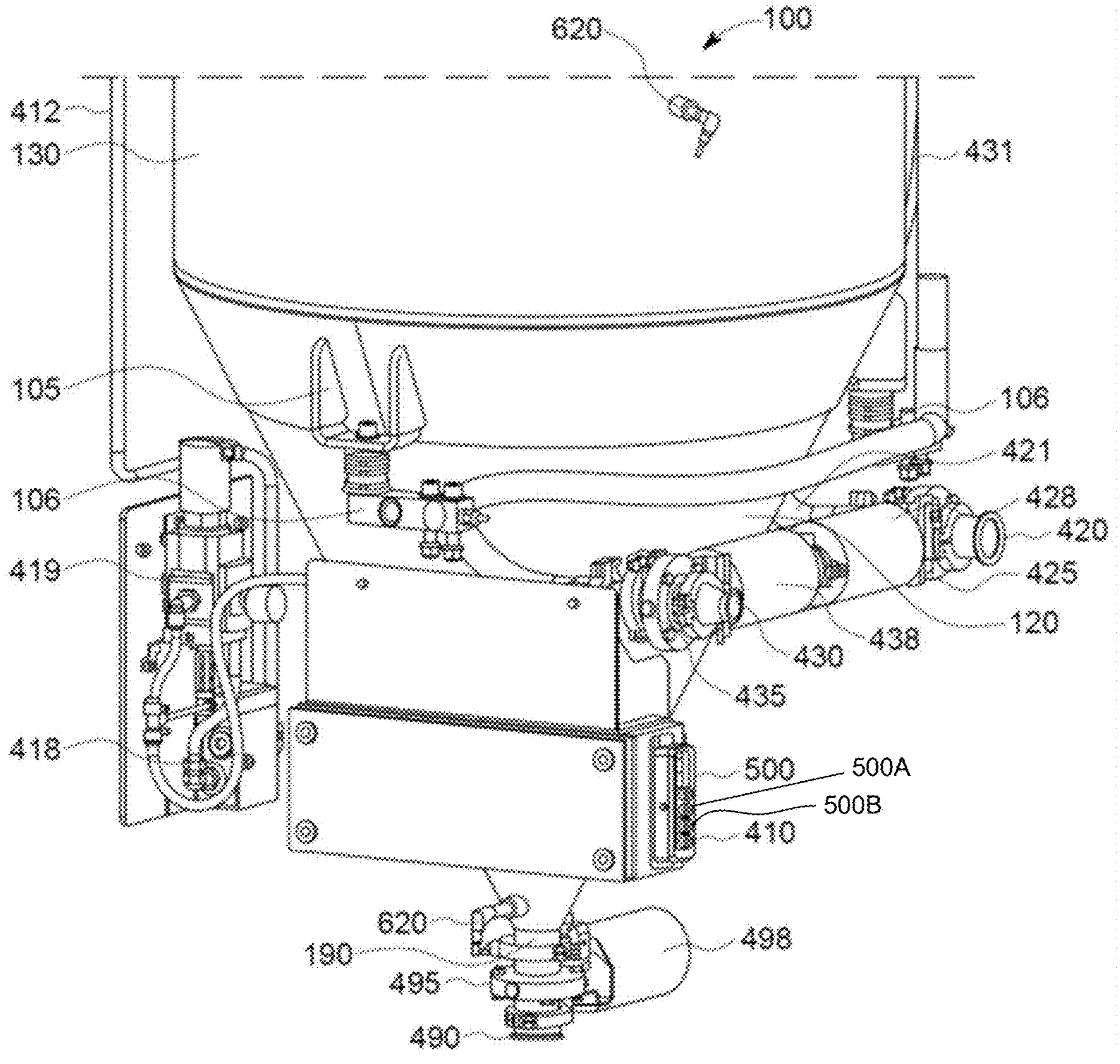
FIG. 5 shows another detail of the partially mounted powder container.

FIG. 5 is a detail view of lower portion of powder container. Some parts like e.g., the optional frame 200 have been omitted to declutter the figure. Depicted is a portion of the vessel 100, i.a., the frustoconical bottom 120. At the lower end of the frustro conical bottom 120 is a powder outlet 190. Attached to the powder outlet 190 of the vessel may be an inlet of a powder-outlet valve 495, one could as well consider the powder outlet 190 of the vessel as powder inlet of the powder-outlet valve 495. The outlet of the powder-outlet valve 495 may be provided by or attached to a powder-outlet port 490. The powder-outlet valve 495 may include a valve member being driven by a powder outlet valve actuator 498.

As can be seen in as well in FIG. 5, the vessel facing side of an inert gas inlet port may be connected to a first end of a pressure compensation valve 425. The other end of the pressure compensation valve 425 may be connected, as shown, to a pressure compensation conduit 421 being fluid communication with a pressure-compensation opening 141 of the vessel 100 (see FIG. 2).

A gas-removal opening 142 in the top 110 of the vessel 100 (see FIG. 2) may be connected via a gas removal conduit to the inlet side of a gas removal valve 435. The outlet side of the gas removal valve 435 may be or be in fluid communication with the gas removal port 430 (see FIG. 5). A valve member of the gas removal valve 435 may be driven by a gas removal valve actuator 438 (FIG. 5).

As can be seen in FIG. 5, vessel-support mounts 105 may be attached to the vessel 100. At least one of the vessel-support mounts 105 may preferably be attached via a strain gauge 106 to the vessel support structure 200 (cf. FIG. 1). The strain gauge may be replaced by any other load or force sensor 106 enabling to determine the gravitational force of the vessel being supported by the vessel support structure 200. In this sense, the term strain gauge is to be considered as a pars-pro-toto for any force measurement sensor. The force measurement sensor 106 enables to determine the amount of powder in the vessel (as the empty mass is of the vessel 100 is known or at least can be determined) as well as to measure accelerations of the vessel 100 that may result in a compactification of powder in the vessel 100.

A first portion of inert-gas conduit 412 may connect the inert gas inlet 410 with an outlet of an inert gas inlet valve 418. In the depicted example the inert gas inlet valve 418 is a bistable solenoid valve (i.e., the valve actuator is a solenoid drive), but other valves may be used as well. The inlet of the inert gas inlet valve 418 may be connected by another portion of the inert-gas conduit 412 to an outlet of an optional pressure-reducing valve 419. The inlet of the pressure-reducing valve 419 may preferably be connected to an inert gas inlet port 410 of the powder container 1.

In the lowest tenth (more generally the lowest $i^{th}$, wherein $i \geq 5$ for example i=10, 12, 15, 20, 25, . . . ; there is no theoretical maximum of i, but generally one may assume that i should not be larger than 100) of the conical bottom 120 may preferably be a powder sensor 620, configured to determine if the lowest $i^{th}$ of the conical bottom 120 is filled with powder or not. This sensor can be a light barrier sensor, a capacitive sensor, an ultrasound sensor or the like. If this powder sensor 620 indicates that at the height of the powder sensor is no powder left, one has an accurate estimate of how much powder is left in the vessel any may take appropriate measures (e.g., stopping the AM-process, initiating a container swap and/or a refill, . . . ).

FIG. 5 as well shows a connector 500. The connector 500 has a number of ports. Some of these ports may be an electrical port 500A, i.e., electric contacts to be electrically contacted by their counterparts of a mating connector, and/or a waveguide port 500B. Other ports may as well be fluid ports, like e.g., the inert gas inlet port 410. Other fluid ports may as well be connectors to actuators being operated based on a fluid pressure.

Figure 6:
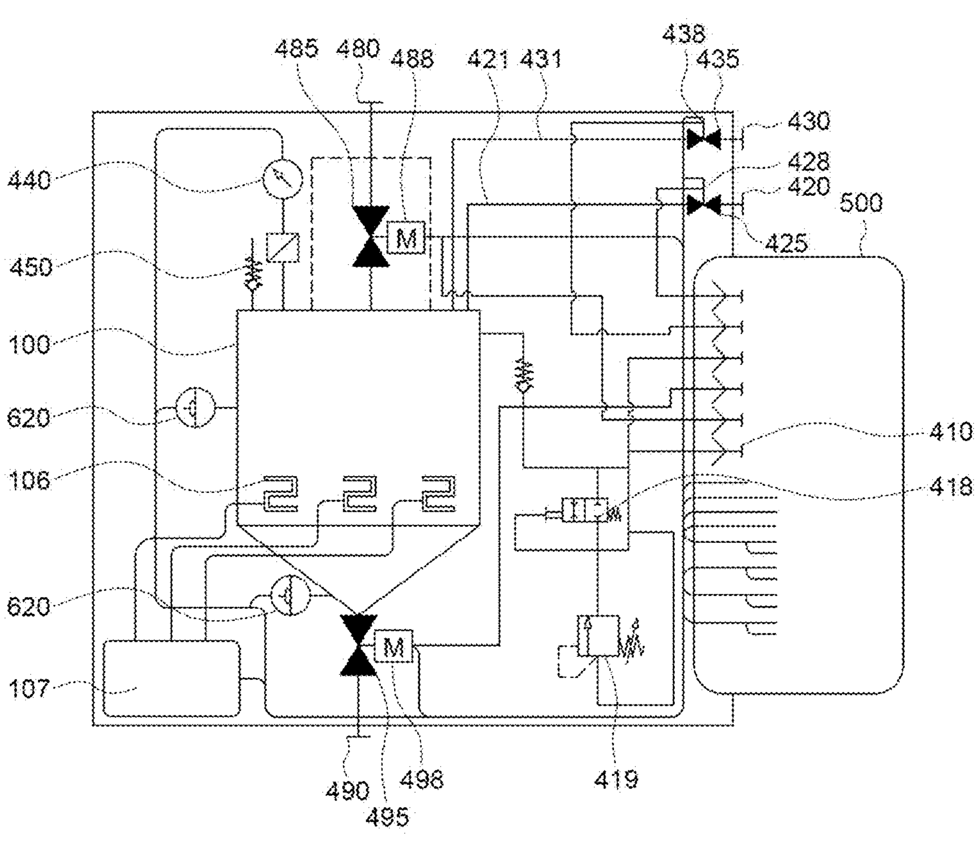
FIG. 6 is an example connection diagram.

An example connection scheme for the powder container 1 is shown in FIG. 6. As can be seen, all actuators 418, 428, 438, 488, 498 may be directly connected to a corresponding port of the connector 500 by separate actuator control lines. It is not necessary that all actuators 418, 428, 438, 488, 498 are directly connected, but it is preferred. It is a sufficient of if a subset of the actuators 418, 428, 438, 488, 498 is directly connected to a corresponding port of the connector. Thereby, it is possible to avoid an erroneous operation of the actuator in a powder handling station in which the corresponding actuator never needs to be actuated by simply not connecting the corresponding ports of the mating connector (being equivalent to simply omitting the corresponding ports in the mating connector). Of course, the actuators may share a common ground port or power a supply port, but each actuator of the subset can be controlled by providing a signal to a separate port or a number of separate ports of the connector. The powder container 1 may include a container controller 107 being connected by some data link to a data link port of connector but said container controller 107 is not configured to control operation of the actuators of the subset, preferably by omitting control lines connection between the container controller 107 and the corresponding actuators. In the present case, the container controller 107 is connected to the force sensors 106 and provides a signal being representative for the mass of the vessel to a port of the connector 500. This signal can be sent via a data link or as in this example an analog signal (i.e., a voltage representing the mass).

Figure 7:
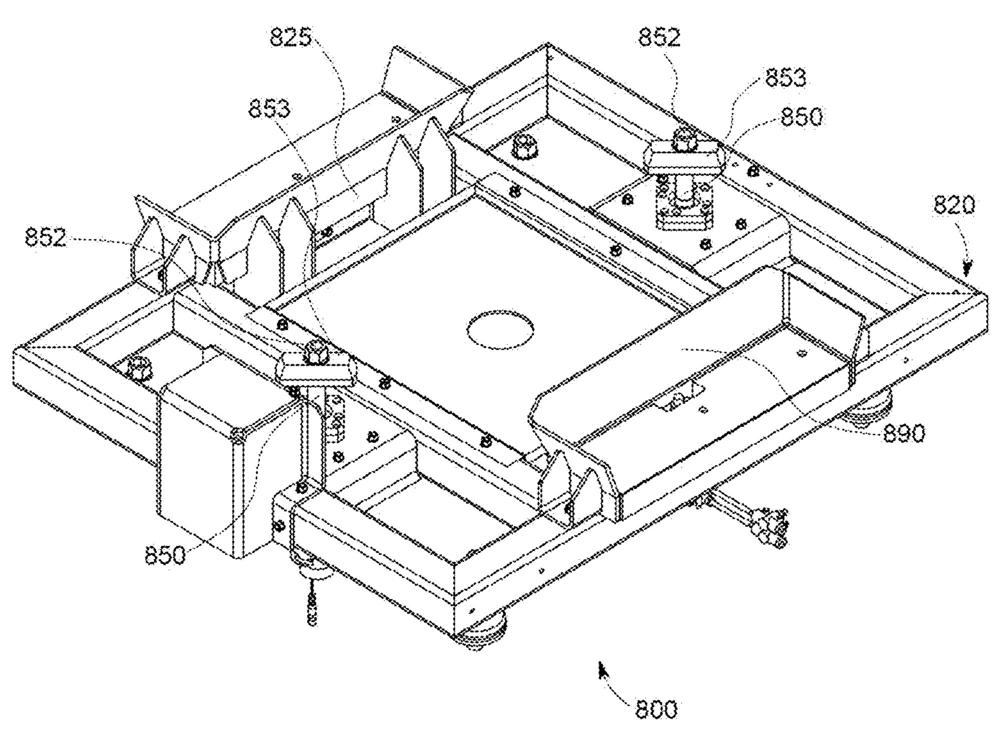
FIG. 7 shows a bottom section of a frame, with its bottom side facing upwards.

FIG. 7 shows a perspective bottom view of an example bottom section 800, i.e., the bottom side is shown to face upwards. The example bottom section 800 may have a bottom section support structure 820 with forklift receptacles. Preferably there is a powder outlet port protector 825 in between of the forklift receptacles. The powder outlet port protector 825 is a structural element blocking a path form the side of the vessel support structure 200 towards the powder-outlet port. Thus, if a forklift is improperly positioned relative to the powder container 1, the powder outlet-port cannot be torn of be otherwise damaged by the fork.

Further, the powder container 1 may include one or more locking shafts 850. The locking shafts 850 may be rotatably supported by a support structure of the vessel support structure 200, like for example as shown by the support structure 820 of the bottom section 800. In this example two locking shafts 850 are shown, but any other number may be appropriate as well (e.g. one, three, four, five, . . . ). The locking shaft 850 has a proximal end and a distal end 852. As can be seen, the distal end 852 may face downwards and may be torque transmittingly coupled to a locking member 853. The coupling may as well be an elastic coupling. A locking-shaft actuator 858 may be coupled (the coupling may be an elastic coupling) and hence be configured to rotate the locking shaft (850) from an open and to a closed position and from the close to the open position. In the present example, the change of positions is, strictly speaking, only a change of the orientation, but a translation may serve the same purpose, as well as a superposition of a translation and a rotation. In this example, the locking member 853 is provided by a bar that forms two pins that radially extend over the contour of the locking shaft 850. In the open position, the locking member 853 may hence be inserted through an elongated slot of a powder container support of a powder handling station and subsequently the locking actuator may be controlled to move the locking shaft 850 and hence the locking member 853 into the closed position in which it interlocks with the material forming the slot. The locking-shaft actuator 858 may be connected by a locking actuator control line, preferably directly, with a separate port of the connector 500.

To ease proper positioning of the powder container 200 on powder container support of a powder handling station the vessel support structure 200 includes, preferably, at its bottom section 800, e.g. attached the bottom section support structure 820, guide plates 890 that may interact with complementary guide means of a powder container support of a powder handling station to move the powder container into a predetermined position and orientation when lowering the powder container 1 onto the powder container support.

The powder container in FIG. 9 (sub-FIGS. 9.1, 9.2, 9.3, and 9.4) has a frame 300 with a rotatable vessel support structure 200, herein as well briefly vessel support structure. Accordingly, the support structure 200 is attached via a rotary bearing 250 to the frame 300. The rotational axis of the rotary bearing 250 may preferably be at least essentially horizontal if the rollers of the frame 300 are on a level ground. A rotary drive 255 with a crank handle 260 is configured to rotate the vessel support structure 200 with ease around the rotational axis of the rotational bearing. Of course, the manually powered rotary drive 255 can be replaced by an electrically or hydraulically powdered drive (or by a drive being powdered by any other energy source). The drive may even be omitted. In this case a rotation can be performed by hand, i.e. without any drive support.

The rotatable support structure may include a bottom 220 and a side support 225. An optional powder removal funnel 150 of the support structure be movably attached to the side structure 225 and/or to the support structure bottom 220. Thus, the optional powder removal funnel 150 may be configured to rotate together with the other parts of the rotatable support structure, while being movable between a first position and/or first orientation and a second position and/or second orientation as will be apparent in FIGS. 9.1 to 9.4. Thus, a change in the position and/or orientation of the powder removal funnel 150 referenced is relative position and/or orientation respectively relative to the other support structure bottom 220 (being itself rotatably supported relative to the frame 300).

Figure 8:
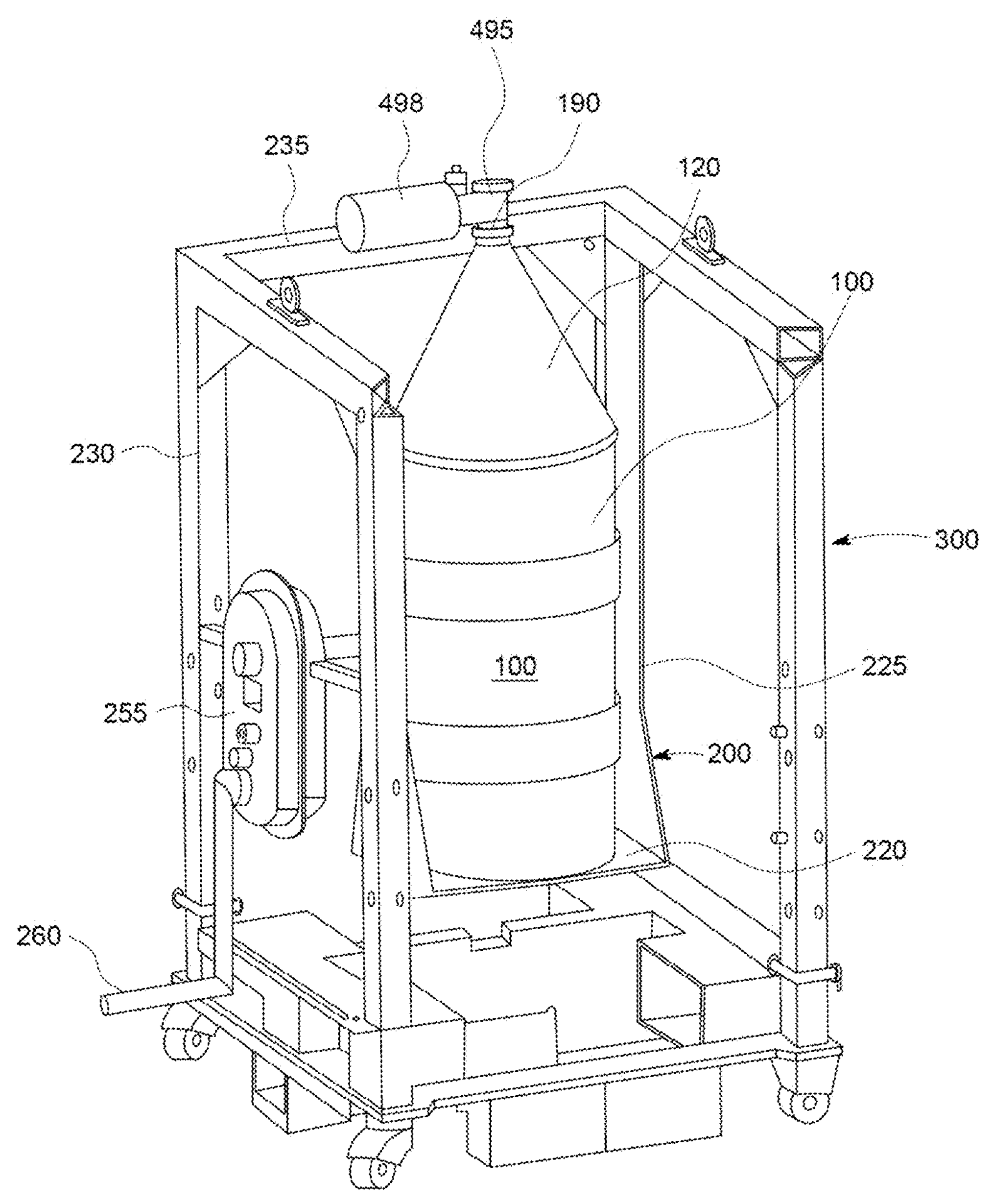
FIG. 8 shows a simplified example of powder container with a rotatable support structure.

In FIG. 8 the optional powder removal funnel 150 is shown in its first position and first orientation. As can be seen in FIG. 9.1 the powder vessel 100 can be removed from the support structure 200 if the powder removal funnel has been moved into its second position and/or orientation. A movable attachment 125 of the powder removal funnel 150 to the support structure 200 is hidden in FIG. 8 but sketched in FIGS. 9.1 to 9.4. As being implicit, the powder removal funnel 150 has a powder inlet end with a powder inlet opening and a powder outlet end with a powder outlet opening 190. As shown in FIG. 8, an optional powder outlet valve 495 may be attached to the powder outlet opening 190. The optional powder outlet valve 495 may have a powder outlet valve actuator 498. The other details of FIG. 8 have already been described with reference to the other FIGs and the same reference numerals have been used where appropriate.

Inserting a new powder vessel 100 to the powder container as shown in FIG. 8 is sketched in FIGS. 9.1 to 9.4 and starts with the situation depicted in FIG. 9.1:

A powder vessel 100 may be located outside of the powder container, the support structure may be configured to be rotated such that the support structure bottom 220 is below the powder removal funnel 150 and the powder removal funnel 150 may be in its second position and/or orientation in which it provides a path for the powder vessel 100 from the outside to the support structure bottom 220 (see FIG. 9.1). Next, as sketched in FIG. 9.2 the powder vessel 100 may be moved, e.g., by a lifter or a crane, on top of the support structure bottom 220. Thus, the vessel bottom 120 resides and is supported by the support structure bottom 220 of the rotatable support structure 200. Further, a top cap 115 of the powder vessel 100 can be removed, if still present. Subsequently, the powder removal funnel 150 may be moved into its first position and/or first orientation. In this position and/or first orientation the wider inlet end of the powder removal funnel sealingly attaches to the powder vessel thereby providing a fluid communication between the powder vessel volume and the powder removal funnel. Further, the powder vessel may preferably be secured relative to the support structure bottom. This may be obtained for example by locking the powder removal funnel in its first position and/or first orientation relative to the support structure bottom. In addition, or alternatively other fixation means may be used as well. Examples are clamping jaws, suction cups, etc.

As can be seen in FIG. 9.4, the powder support structure may now be rotated into an inverted orientation, i.e., the powder removal funnel may now be below vessel bottom and/or as well be the support structure bottom. Optional powder in the powder vessel will thus flow into the powder removal funnel and may be withdrawn via a powder outlet of the powder removal funnel 150. The outlet 190 and an optional powder outlet valve 495 of the powder removal funnel 150 are shown in FIG. 8, and have been omitted in FIGS. 9.1 to 9.4 for simplicity, only.

It will be appreciated to those skilled in the art having the benefit of this disclosure that this invention provides a powder container for handling powder in an additive manufacturing process. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 powder tank
100 powder vessel/vessel
105 vessel-support mounts
106 force sensors, e.g., strain gauge
107 container controller/controller
110 top of powder vessel/vessel top
115 cap
120 bottom of vessel
125 attachment of the powder removal funnel 150 to the support structure 200
130 side wall of powder vessel
142 pressure-compensation opening
144 gas-removal opening
180 powder inlet of vessel
190 powder outlet of vessel
200 vessel support structure, e.g., a support frame
220 support structure bottom/bottom of the support structure
230 vertical post
235 cross beam
240 rotary bearing
250 rotary drive
300 support frame
410 inert gas inlet port
411 inert-gas conduit
418 inert gas inlet valve
419 pressure-reducing valve
420 pressure compensation port
421 pressure compensation conduit
425 pressure-compensation valve
428 pressure compensation valve actuator
430 gas-removal port
431 gas-removal conduit
435 gas-removal valve
438 gas removal valve actuator
440 vessel-pressure sensor

450 safety valve
480 powder-inlet port
482 grate
485 powder-inlet valve
486 powder inlet valve member
488 powder inlet valve actuator
489 grate
490 powder-outlet port
495 powder-outlet valve
498 powder outlet valve actuator
500 connector
620 powder sensor
800 bottom section
820 bottom section support structure
825 powder outlet port protector
850 locking shaft
852 distal end
853 locking member
858 locking-shaft actuator
890 guide plates

The invention claimed is:

1. A powder container for handling powder in an additive manufacturing process, the powder container comprising at least:

a powder vessel enclosing a vessel volume for storing said powder, a vessel support structure supporting the powder vessel, a set N of n sensors configured to determine a set of n observables, wherein n is an integer greater than or equal to two, n∈{2, 3, 4, . . . , $n_{max}$}, a set L of l actuators configured to drive at least one mechanical device of the powder container, wherein l is a positive integer number, characterized in that the powder container further comprises at least (i) transportation means attached to the vessel support structure, and (ii) a plug or socket connector having electric terminals, a fluid terminal, and/or a waveguide port aggregated therein and configured to be connected with a corresponding connector of a powder handling station in the additive manufacturing process at least to avoid unintended errors in operation of the powder container caused by mis-connecting or not connecting an electric terminal, a fluid terminal, and/or a waveguide port of the plug or socket connector to the powder handling station, and in that each sensor of a subset M of m sensors, of the set N of n sensors, is connected via a separate measurement line to a corresponding separate electric terminal, fluid terminal, and/or waveguide port of said plug or socket connector, wherein m is an integer number with 2≤m≤n, to avoid said unintended errors, and/or in that each actuator of at least a subset K of k actuators, of the set L of l actuators, is connected via a separate actuator control line to a corresponding separate electric terminal, fluid terminal, and/or a waveguide port of said plug or socket connector, wherein k is an integer number with 2≤k≤l, wherein:

an inert-gas inlet valve and/or a pressure-reduction valve of the powder container are/is located in an inert gas line providing a fluid communication between an inert-gas terminal of said plug or socket connector of the powder container and an inert-gas inlet of the powder vessel.

2. A powder container of claim 1, wherein the powder container further comprises at least:

a first actuator configured to drive a first mechanical function of the powder container, a powder-inlet valve with a powder-inlet valve inlet and with a powder-inlet valve outlet, wherein the powder-inlet valve outlet is connected to a powder inlet of the powder vessel and the powder-inlet valve inlet is connected with a powder-inlet port of the powder container, and/or a powder-outlet valve with a powder-outlet valve inlet and with a powder-outlet valve outlet, wherein the powder-outlet valve inlet is connected to a powder outlet of the powder vessel and the powder-outlet valve outlet is connected with a powder-outlet port of the powder container.

3. A powder container of claim 1, comprising at least one funnel in fluid communication with a powder inlet of the powder vessel and/or a powder outlet of the powder vessel.

4. A powder container of claim 1, wherein the set N of n sensors comprises at least one of:

a vessel pressure sensor configured to measure pressure in the vessel volume, a force sensor configured to measure a force exerted by the powder vessel on a support frame rotatably supporting the vessel support structure, a pressure sensor configured to measure a pressure upstream of a powder-inlet valve, a pressure sensor configured to measure the pressure downstream of a powder-outlet valve, a differential pressure sensor configured to measure a pressure difference between the vessel volume and a space upstream of the powder-inlet valve, a differential pressure sensor configured to measure the pressure difference between the vessel volume and a space downstream of the powder-outlet valve, a gas concentration sensor configured to determine at least the partial pressure and/or the concentration of a gas constituent of a gas in the vessel volume and/or the space upstream the powder-inlet valve and/or the space downstream the powder-outlet valve, an upper powder level sensor located in an upper third of the powder vessel and configured to determine if a powder level in the powder vessel is above or below a location of the upper powder level sensor, and a lower powder level sensor located in a lower third of the powder vessel and configured to determine if a powder level in the powder vessel is above or below a location of the lower powder level sensor.

5. A powder container of claim 1, wherein:

the powder container has an inert gas intake connector, the powder container has a pressure-reducing valve with a high-pressure inlet and a low-pressure outlet, the powder vessel has an inert gas inlet opening, the inert gas intake connector is in fluid communication with the high-pressure inlet of the pressure-reducing valve, and the low pressure-outlet of the pressure-reducing valve is in fluid communication with the inert gas opening.

6. A powder container of claim 1, wherein the powder container comprises a control valve with a control-valve actuator and wherein the control-valve actuator is a member of the subset K of k actuators of the set L of l actuators.

7. A powder container of claim 1, wherein:

the powder container has a locking shaft that is rotatably supported relative to the powder vessel, the locking shaft has a proximal end and a distal end, a locking member is torque transmittingly coupled to the distal end of the locking shaft and the locking shaft is driven by a locking-shaft actuator, and the locking-shaft actuator is a member of the subset K of the set L of l actuators.

8. An additive manufacturing device, comprising:

the powder container according to claim 1, wherein a controller of the additive manufacturing device is connected via a multi-port connector of the powder container (a) to a first actuator and/or to a second actuator of the powder container, wherein said first actuator and/or said second actuator is configured to drive a second mechanical function of the powder container, and/or (b) to the at least one sensor of the set N of sensors.

9. A powder container of claim 1, comprising a support frame rotatably supporting the vessel support structure by at least one rotational bearing with a rotational axis.

10. A powder container of claim 9, wherein:

the vessel support structure comprises a powder removal funnel, and the powder removal funnel is movably attached to the vessel support structure with a movable attachment, and the movable attachment is configured to move the powder removal funnel relative to the vessel support structure at least from a first position and/or a first orientation into a second position and/or a second orientation and backwards.

11. A powder container of claim 9, wherein the powder container comprises a locking mechanism that is configured to releasably block a rotation of the vessel support structure relative to the support frame.

12. A powder container of claim 9, wherein the powder vessel has a powder vessel bottom, and wherein the powder vessel bottom is supported by a support structure bottom of the vessel support structure.

13. A powder container of claim 12, wherein the powder removal funnel has a powder removal funnel powder inlet, and wherein the powder removal funnel powder inlet is in fluid communication with the vessel volume via an opening of the powder vessel.

14. A powder container of claim 13, wherein the powder removal funnel covers the opening of the powder vessel.

15. A powder container of claim 1, wherein the powder container comprises a gas removal port in fluid communication via at least a gas removal control valve with the vessel volume, and wherein:

(i) the gas removal control valve has a gas removal control valve actuator and that the gas removal control valve actuator is a member of the subset K of k actuators of the set L of l actuators, wherein k≤l, and/or (ii) the powder container comprises at least a pressure sensor configured to determine a gas pressure upstream or downstream of the gas removal control valve, wherein said pressure sensor is a member of a subset M of the set N of n sensors.

16. A powder container of claim 15, wherein:

a gas removal port connection sensor is connected to a first end of a gas removal port connection sensor line and wherein a second end of the gas removal port connection sensor line is connected to an electrical terminal, the fluid terminal, and/or the waveguide port of said plug or socket connector, and/or the powder vessel is located inside the vessel support structure and said plug or socket connector is attached to the vessel support structure and the electrical terminals, the fluid terminal, and/or the waveguide port of said plug or socket connector face outwardly, and/or the powder container has a locking shaft that is rotatably supported relative to the powder vessel, the locking shaft has a proximal end and a distal end, and a locking member is torque transmittingly coupled to the distal end of the locking shaft and the locking shaft is driven by a locking-shaft actuator.

17. A powder handling station for handling powder provided to or from or being stored in a powder container according to claim 1, characterized in that the powder handling station has a mating multiple port connector dimensioned to be connected to said plug or socket connector of the powder container.

18. A powder handling station of claim 17, wherein the mating multiple port connector has fewer ports than said plug or socket connector of the powder container and/or wherein not all ports of the mating multiple port connector are connected to a corresponding connection line of the powder handling station.

19. An additive manufacturing device, comprising:

the powder handling station according to claim 17, wherein a controller of the additive manufacturing device is connected via said plug or socket connector of the powder container (a) to a first actuator and/or to a second actuator of the powder container, and/or (b) to the at least one sensor of the set N of sensors.

* * * * *